United States Patent [19]

Boussely et al.

[11] 4,098,706

[45] Jul. 4, 1978

[54] LUBRICATING AGENTS FOR THERMOPLASTIC MATERIALS AND PROCESS FOR PREPARING THE SAME

[75] Inventors: Jean Boussely, Paris; Marie-Madeleine Chandavoine; Michel Chignac, both of Sisteron; Claude Grain, Volonne; Charles Pigerol, Saint-Ouen, all of France

[73] Assignee: Sapchim-Fournier-Cimag, Paris, France

[21] Appl. No.: 683,415

[22] Filed: May 5, 1976

[30] Foreign Application Priority Data

May 7, 1975 [FR] France .................................. 75 14359

[51] Int. Cl.² .............................................. C10M 1/24
[52] U.S. Cl. .................................. 252/40.5; 252/46.4; 252/56 R; 260/31.2 R
[58] Field of Search ...................... 252/40.5, 40.4, 48.6, 252/56 R

[56] References Cited

U.S. PATENT DOCUMENTS

| 2,540,570 | 2/1951 | Cyphers | 252/48.6 |
| 2,871,248 | 1/1959 | Kirkland et al. | 252/56 S X |
| 3,640,828 | 2/1932 | Brotz et al. | 252/56 S X |
| 3,988,330 | 10/1976 | Foucks et al. | 252/56 S X |

FOREIGN PATENT DOCUMENTS

| 458,122 | 7/1949 | Canada | 252/40.5 |
| 1,601,595 | 12/1967 | France | 252/40.5 |

*Primary Examiner*—Delbert E. Gantz
*Assistant Examiner*—Andrew H. Metz
*Attorney, Agent, or Firm*—Mason, Kolehmainen, Rathburn & Wyss

[57] ABSTRACT

This application relates to new lubricating associations for thermoplastic materials, which comprise at least two lubricating agents selected from 1,2-propanediol dibehenate, thiodiglycol dibehenate, diethyleneglycol dibehenate, triethyleneglycol dibehenate, trimethylolpropane tribehenate, dipentaerythrite pentabehenate, 1,4-butanediol dibehenate, glyceryl tribehenate, pentaerythrite tetrabehenate and one metallic salt of behenic acid.

This application relates also to the polymers and copolymers of vinyl chloride containing said lubricating associations.

7 Claims, No Drawings

LUBRICATING AGENTS FOR THERMOPLASTIC MATERIALS AND PROCESS FOR PREPARING THE SAME

The present invention relates to new lubricating agents for thermoplastic materials and to a process for preparing the same.

The same lubricating agents, which are formed by reacting behenic acid with aliphatic polyalcohols, are employed alone or in association with each other and/or with a salt of behenic acid and a divalent metal such as: calcium, zinc, cadmium or baryum.

The lubricating agents with which the present invention is concerned are polyesters of behenic acid and one of the following aliphatic polyalcohols: thiodiglycol, 1,4-butanediol, 1,2-propanediol, glycerol, pentaerythritol, dipentaerythritol, diethyleneglycol, triethyleneglycol and trimethylolpropane.

The polyesters of the invention may be prepared by reacting behenic acid with an aliphatic polyalcohol, in the presence of sodium or potassium hydroxide as catalyst and by eliminating the water which forms during the reaction.

The substances of the invention which are listed hereunder are new and are claimed as such:
  1,2-propanediol dibehenate (Compound 1)
  thiodiglycol dibehenate (Compound 2)
  diethyleneglycol dibehenate (Compound 3)
  triethyleneglycol dibehenate (Compound 4)
  trimethylolpropane tribehenate (Compound 5)
  dipentaerythrite pentabehenate (Compound 6)
  1,4-butanediol dibehenate (Compound 7)

On the other hand, the following substances are already known but are claimed herein as new lubricating agents for thermoplastic materials:
  glyceryl tribehenate (Compound 8)
  pentaerythrite tetrabehenate (Compound 9)

Thermoplastic materials are known to stick to the surfaces of the means in which they are formed and it is consequently necessary to add a lubricating agent to the masses of synthetic material in order to delay sticking as long as possible.

Numerous lubricating agents for thermoplastic materials are already known and they generally fall into one of the following two main classes:

(a) External lubricating agents, which aim at reducing interfacial friction and are employed in the proportion of 0.2 to 0.5% by weight. Amongst these agents, glyceryl trimontanate, which is described in British Pat. No. 1,314,269, is one of the most commonly employed on the industrial scale.

(b) Internal lubricating agents, which aim at diminishing the viscosity of the polymer when in the molten state and reducing the shearing forces. They are employed in the proportion of 0.1% to 1% by weight. Amongst these agents, glyceryl trihydroxystearate, which is described by R. LEFAUX in "Les matières Plastiques dans l'Industrie Alimentaire" (Compagnie Francaise d'Editions, 1972), is one of the most widely used in industry.

Mixed esters of aliphatic polyalcohols and higher aliphatic mono- and dicarboxylic acids, such as described in French Pat. No. 2,032,841, are known but are not deemed to be of value, for they provoke, when employed for lubricating polyvinyl chloride, a drop in the softening-point of the resin. Moreover, some of them cause increased sticking of the resin.

The esters of the invention, whether used alone or in association, have been found to be superior to the previously known lubricating agents with respect to one or more of the characteristics generally attributed to such agents. For instance, the compounds of the invention increase the quality of the synthetic material, by improving either the internal lubricating effect or the external lubricating effect, or even both effects.

Furthermore, they have a low degree of toxicity and, when incorporated in a resin which is to be used for manufacturing containers, they have high resistance to extraction from the resin into the contents of the container. These findings are important because they are closely related to the problem of providing containers for food and drink and the possible pollution of the latter by the lubricated polymer from which the container is made.

Finally, the compounds of the invention are not volatile and are stable under the influence of heat and air, even at high temperatures, which is very important with regard to the problems of manipulation and pollution in the workshops where the various operations are carried out.

Since the compounds of the invention may be incorporated into synthetic resins which are to be used for the manufacture of containers for food and drink, their toxicity was studied first and the satisfactory results obtained were such as to justify continuation of the investigation.

A. Acute toxicity

The acute toxicity (LD50) of the compounds listed below was studied by determining the dose of substance which provoked the death of 50% of the animals treated.

A gummy suspension of the substance under study was administered by oral route to groups of at least ten mice and the following results were observed:

| Compound | LD50 (mg/kg) | Toxic symptoms |
|---|---|---|
| 1 | 5000 | none |
| 2 | 5000 | none |
| 4 | 5000 | none |
| 7 | 5000 | none |
| 8 | 5000 | none |
| 9 | 5000 | none |
| calcium behenate | 5000 | none |

B. Internal lubricating power of the compounds of the invention

The compounds of the invention were compared to glyceryl trihydroxystearate which may be considered as the best internal lubricating agent known up to present. This study was performed with the following formula, glyceryl trimontanate being used as external lubricating agent:

| Ingredients | Parts by weight |
|---|---|
| Polyvinyl chloride resin | 100 |
| Anti-shock resin | 11 |
| Acrylic resin | 0.5 |
| Epoxide soja bean oil | 3 |
| Chelating agent 1832 | 0.25 |
| Solution of 2-ethyl-potassium-hexanoate containing 10% of potassium | 0.025 |
| 2-Phenyl-indole | 0.3 |
| Zinc stearate | 0.1 |
| Calcium stearate | 0.3 |
| Glyceryl trimontanate | 0.3 |

The results given in the following Table were obtained from these curves:

| Measurements | glyceryl trihydroxy-stearate | Compound 1 | 2 | 3 | 4 | 5 | 7 | 8 | 9 |
|---|---|---|---|---|---|---|---|---|---|
| Minimal resistant torque in m.kg | 1.075 | 1.060 | 1.070 | 1.050 | 1.070 | 1.060 | 1.070 | 1.065 | 1.065 |
| Decomposition time in min. | 32 | 34 | 34 | 33.5 | 33.5 | 34 | 34 | 34 | 35 |
| Self-heating time in min. | 14 | 10.5 | 14.5 | 11.5 | 11.75 | 12.5 | 11 | 13 | 15 |

| Ingredients | Parts by weight |
|---|---|
| Internal lubricating agent | 1 |

The definition of Chelating Agent 1832 is as follows: Diphenyldecyl phosphite: 67 parts by weight Solution of 10% zinc octoate in diisolbutyl phthalate: 33 parts by weight.

1. Gelation

This study was performed on a plastograph, working at a temperature of 150° C, turning at a speed of 30 r.p.m. and containing a charge of 25 g of powder under constant pressure.

The following results were obtained:

| Lubricating agent | Start of gelation in sec. | End of gelation in sec. |
|---|---|---|
| glyceryl trihydroxystearate | 75 | 210 |
| 1 | 120 | 260 |
| 2 | 110 | 260 |
| 3 | 120 | 270 |
| 4 | 105 | 265 |
| 5 | 180 | 380 |
| 7 | 120 | 255 |
| 8 | 180 | 380 |
| 9 | 360 | 585 |

Glyceryl trihydroxystearate has a shorter gelation time than that of the compounds of the invention. Amongst these latter, pentaerythrite tetrabehenate (Compound 9) is the most difficult to gel.

The behenates according to the invention have thus been found to retard the commencement and the end of gelation, which is a desirable quality as far as internal lubrication is concerned. The increase of gelation time is particularly valuable when degassing of the resin is necessary.

2. Dynamic thermostability of the resin

This study was also performed on a plastograph, but working at a temperature of 210° C, turning at a speed of 60 r.p.m. and containing a charge of 30g of gelled material.

Two curves were drawn for each lubricating agent, namely:
- a decomposition curve giving the value of the minimal resistance torque (m.kg) and the time of decomposition;
- a curve giving the self-heating time in relation to temperature.

The self-heating time is defined by the moment when the temperature of the material exceeds the temperature of the plastograph (210° C).

Pentaerythrite tetrabehenate (Compound 9) presents the best score with regard to decomposition and self-heating times, thus showing good qualities for internal lubrication.

Taken all round, the other behenates are equivalent to each other and present a better score than glyceryl trihydroxystearate with regard to minimal resistant torque and time of decomposition.

Some behenates present a self-heating time inferior to that of glyceryl trihydroxystearate but which is nevertheless acceptable for a lubricating agent.

3. Sticking of the lubricated resin

This study was performed by placing the resin in a mixer of which the cylinders were heated to 210° C and the material was submitted to alternate periods of 3 minutes of mixing and 3 minutes of rest, the space between the cylinders being 0.25 mm.

The following results were obtained:

| Measurement | glyceryl trihydroxy-stearate | Compound 1 | 2 | 3 | 4 | 5 | 7 | 8 | 9 |
|---|---|---|---|---|---|---|---|---|---|
| Resistance time to sticking in min. | 19 | 21.5 | 21 | 22 | 23 | 27 | 23 | 26 | 26 |

Glyceryl tribehenate (Compound 8) did not stick but the resin became black after a period of 26 minutes.

Trimethylolpropane tribehenate (Compound 5) stuck and decomposed after a period of 27 minutes.

Finally, pentaerythrite tetrabehenate (Compound 9) stuck and decomposed after a period of 26 minutes.

From the above results, it may be concluded that the compounds of the invention are superior to glyceryl trihydroxystearate with regard to sticking.

4. Conclusion

As far as the internal lubricating effect is concerned, the polyalcohol behenates of the invention were found to be superior to glyceryl trihydroxystearate, which is considered to be the best lubricating agent known up to present.

C. External lubricating power of the compounds of the invention

The compounds of the invention were compared to glyceryl trimontanate, which is considered at present as the best external lubricating agent which does not provoke opacity.

This study was performed with the following formula of resin, glyceryl trihydroxystearate being used as internal lubricating agent:

| Ingredients | Parts by weight |
| --- | --- |
| Polyvinyl chloride resin | 100 |
| Anti-shock resin | 11 |
| Acrylic resin | 0.5 |
| Epoxide soja bean oil | 3 |
| Chelating agent 1832 | 0.25 |
| Solution of 2-ethyl-potassium-hexanoate containing 10% of potassium | 0.025 |
| 2-Phenyl-indole | 0.3 |
| Zinc stearate | 0.1 |
| Calcium stearate | 0.3 |
| Glyceryl trihydroxystearate | 1 |
| External lubricating agent | 0.3 |

1. Gelation

This study was performed on a plastograph, working at a temperature of 150° C, turning at a speed of 30 r.p.m. and containing a charge of 25g of powder under constant pressure.

The following results were obtained:

| Lubricating agent | Start of gelation in sec. | End of gelation in sec. |
| --- | --- | --- |
| Glyceryl trimontanate | 75 | 210 |
| 1 | 50 | 210 |
| 2 | 40 | 180 |
| 5 | 45 | 190 |
| 7 | 45 | 210 |
| 8 | 50 | 210 |
| 9 | 40 | 200 |

The compounds of the invention began to gell before glyceryl trimontanate whereas the end of gelation occurred after about the same period of time.

As far as gelation is concerned, the compounds of the invention, although not superior to glyceryl trimontanate, nevertheless present very useful properties.

2. Static thermostability of the lubricated resin

This study was performed by using the method which is described in French Pat. No. 2,273,841, the temperature of the oven being maintained at 185° C.

Glyceryl trimontanate and the compounds of the invention were found to be similar with regard to the static thermostability of the lubricated resins. However, 1,2-propanediol dibehenate and thiodiglycol dibehenate markedly improved the thermostability of the resins which were maintained in the oven for 50 minutes at 185° C.

3. Dynamic thermostability of the lubricated resin

This study was performed on a plastograph, working at 190° C, turning at a speed of 60 r.p.m. and containing a charge of 30g of gelled material.

Two curves were drawn for each lubricating agent, namely:
- a decomposition curve giving the value of the minimal resistant torque (m.kg) and the time of decomposition.
- a curve giving the self-heating time in relation to temperature.

The results given in the following Table were obtained from these curves:

| Measurements | Compound | | | | | |
| --- | --- | --- | --- | --- | --- | --- |
| | glyceryl trimontanate | 1 | 2 | 5 | 7 | 8 | 9 |
| Minimal resistant torque in m.kg | 1.075 | 1.025 | 1.020 | 1.055 | 1.030 | 1.035 | 1.030 |
| Decomposition time in min. | 32 | 37.5 | 33.5 | 35.5 | 35 | 35 | 34.5 |
| Self-heating time in min. | 14 | 17.75 | 14.75 | 14.75 | 16 | 15.5 | 15.75 |

These results show that the compounds of the invention are superior to glyceryl trimontanate since they have:
- a weaker minimal resistant torque
- a greater decomposition time
- a greater self-heating time 1,2-Propanediol dibehenate (Compound 1) is far superior to the other compounds in this test.

4. Sticking of the lubricated resin

This study was performed by placing the resin in a mixer of which the cylinders were heated to 210° C and the material was submitted to alternate periods of 3 minutes of mixing and 3 minutes of rest, the space between the cylinders being 0.25mm.

The following results were obtained:

| Measurements | Compound | | | | | |
| --- | --- | --- | --- | --- | --- | --- |
| | glyceryl trimontanate | 1 | 2 | 5 | 7 | 8 | 9 |
| Resistance time to sticking in min. | 19 | 16 | 20 | 15.5 | 17 | 13 | 19 |

Although sometimes inferior to glyceryl trimontanate, the compounds of the invention are nevertheless valuable lubricating agents with regard to resistance to sticking.

5. Conclusion

As far as external lubrication is concerned, the most significant property is the resistance time to sticking. In this respect, the compounds of the invention and glyceryl trimontanate may be considered as more or less equivalent although some behenates are slightly inferior to glyceryl trimontanate. However, they markedly improve the resistance of the resin to thermal decomposition, owing to lower internal friction due to lower viscosity, as is proved by the results obtained with the plastograph. This latter finding confirms the excellent internal lubricating properties of the compounds of the invention.

D. Lubricating power of binary mixtures of the behenates of the invention

In this test, binary mixtures of polyalcohol behenates were compared to the association glyceryl trimontanate — glyceryl trihydroxystearate, which are respectively the best external lubricating agent which does not provoke any opacity and the best internal lubricating agent known up to present. This study was performed with the following formula of resin:

| Ingredients | Parts by weight |
| --- | --- |
| Polyvinyl chloride resin | 100 |

-continued

| Ingredients | Parts by weight |
|---|---|
| Anti-shock resin | 11 |
| Acrylic resin | 0.5 |
| Epoxide soja bean oil | 3 |
| Chelating agent 1832 | 0.25 |
| Solution of 2-ethyl-potassium-hexanoate containing 10% of potassium | 0.025 |
| 2-Phenyl-indole | 0.3 |
| Zinc stearate | 0.1 |
| Calcium stearate | 0.3 |
| Internal lubricating agent | 1 |
| External lubricating agent | 0.3 |

In the tests involving the above binary mixtures of behenates, thodiglycol dibehenate was considered as the internal lubricating agent as compared to glyceryl trihydroxystearate, while pentaerythrite tetrabehenate, 1,4-butanediol dibehenate and 1,2-propanediol dibehenate were considered as external lubricating agents as compared to glyceryl trimontanate.

The following mixtures were tested, in a ratio of 10/3:

glyceryl trihydroxystearate — glyceryl trimontanate (V)

thiodiglycol dibehenate — pentaerythrite tetrabehenate (W)

thiodiglycol dibehenate — 1,4-butanediol dibehenate (X)

thiodiglycol dibehenate — 1,2-propanediol dibehenate (Y)

The following mixture was also tested, in the ratio of 8/3:

thiodiglycol dibehenate — pentaerythrite tetrabehenate (Z)

1. Gelation

This study was performed on a plastograph working at 150° C, turning at a speed of 30 r.p.m. and containing a charge of 25g of powder under constant pressure.

The following results were obtained:

| Mixture | Start of gelation in sec. | End of gelation in sec. |
|---|---|---|
| V | 70 | 210 |
| W | 90 | 230 |
| X | 80 | 210 |
| Y | 70 | 210 |
| Z | 90 | 270 |

The binary mixtures of behenates have been found to retard the commencement and the end of gelation to a greater extent than the reference mixture V, with the exception of mixture Y which has a gelation time identical to that of the latter. This is a desirable quality as far as lubrication of thermoplastic materials is concerned. The increase of gelation time is particularly valuable when degassing of the resin is necessary.

The binary mixtures containing pentaerythrite tetrabehenate (W and Z) are the most valuable with regard to gelation.

2. Static thermostability of the lubricated resin

This study, which was carried out as indicated above, showed that, in all cases, the colouration obtained was of the same intensity.

3. Dynamic thermostability of the lubricated resin

This study was also performed on a plastograph, but working at a temperature of 190° C, turning at a speed of 60 r.p.m. and containing a charge of 30g of gelled material.

Two curves were drawn for each binary mixture, namely:

a decomposition curve giving the value of the minimal resistant torque (m.kg) and the time of decomposition;

a curve giving the self-heating time in relation to temperature.

The results given in the following Table were obtained from these curves:

| | Measurements | | |
|---|---|---|---|
| Mixture | Minimal resistant torque in m.kg | Decomposition time in min. | Self-heating time in min. |
| V | 1.075 | 32 | 14 |
| W | 1.060 | 34 | 12 |
| X | 1.030 | 35 | 12 |
| Y | 1.035 | 34.5 | 17 |
| Z | 1.040 | 32 | 12 |

These results show the superiority of the binary mixtures of behenates over mixture V since they have:

a lower minimal resistant torque a higher decomposition time (the same in the case of mixture Z).

It should be noted that mixture Y (thiodiglycol dibehenate — 1,2-propanediol dibehenate) has a particularly high self-heating time.

4. Sticking of the lubricated resin

This study was performed by placing the resin in a mixer of which the cylinders were heated to 210° C and the material was submitted to alternate periods of 3 minutes of mixing and 3 minutes of rest, the space between the cylinders being 0.25 mm.

The following results were obtained:

| | Mixture | | | | |
|---|---|---|---|---|---|
| Measurements | V | W | X | Y | Z |
| Resistance time to sticking in min. | 19 | 21.5 | 20 | 20 | 21.5 |

From the above results, it may be concluded that the mixtures of the invention are superior to mixture V with regard to sticking.

5. Extrusion and blowing

Resins, as defined above and containing respectively one of the binary mixtures V, W, X and Y, were extruded with an extruder fitted with a screw having a diameter of 45mm. The four resins tested were comparable with regard to friction and extrusion, those containing behenate mixtures were perfectly extruded.

Bottles were moulded with the resins indicated above and it was observed that the four resins gave comparable results with regard to behavious on blowing. Mixtures V, W and X gave identical bottles, while a more transparent bottle was obtained with mixture Y.

6. Conclusion

As far as lubrication is concerned, the reference mixture namely glyceryl trihydroxystearate — glyceryl trimontanate can be advantageously replaced by the following binary mixtures:

thiodiglycol dibehenate — 1,2-propanediol dibehenate thiodiglycol dibehenate — pentaerythrite tetrabehenate thiodiglycol dibehenate — 1,4-butanediol dibehenate E. Synergetic lubricating power of binary mixtures of polyol behenate + metallic behenate This study was performed in two steps:
(1) Comparison between the lubricating properties of the binary mixture glyceryl tribehenate — calcium behenate and those of known mixtures such as glyceryl trimontanate-calcium stearate or 1,4-butanediol dimontanate neutralized with lime.
(2) Comparison between the lubricating properties of the mixture glyceryl tribehenate — calcium behenate, chosen as reference for this trial, and those of the binary mixtures thiodiglycol dibehenate — calcium behenate and pentaerythrite tetrabehenate — calcium behenate.

(a) Comparison between glyceryl tribehenate and glyceryl trimontanate

This study was performed with the following formula:

| Ingredients | Parts by weight |
| --- | --- |
| Polyvinyl chloride resin | 100 |
| Anti-shock resin | 11 |
| Acrylic resin | 0.5 |
| Epoxide soja bean oil | 3 |
| Chelating Agent 1832 | 0.25 |
| Solution of 2-ethyl-potassium-hexanoate containing 10% of potassium | 0.025 |
| 2-Phenyl-indole | 0.3 |
| Zinc stearate | 0.1 |
| Calcium stearate | 0.1 |
| Glyceryl trihydroxystearate | 1 |
| Glyceryl tribehenate or glyceryl trimontanate | 0.5 |

1. Static thermostability of the lubricated resin

Identical statis thermostability was observed with both glyceryl tribehenate and glyceryl trimontanate, both resins showing abrupt decomposition after 60 minutes.

2. Gelation

This study was performed on a plastograph, working at a temperature at 150° C, turning at a speed of 30 r.p.m. and containing a charge of 25g of powder under constant pressure.

The following results were obtained:

| Lubricating agent | Start of gelation in sec. | End of gelation in sec. |
| --- | --- | --- |
| Glyceryl tribehenate | 20 | 90 |
| Glyceryl trimontanate | 20 | 90 |

As can be seen, gelation times were identical.

3. Dynamic thermostability of the lubricated resin

This study was performed on a plastograph, working at 190° C and turning at a speed of 60 r.p.m., on which the decomposition time of a gelled material was measured. Minimal resistant torque and temperature were recorded throughout the assay and the self-heating time was noted, i.e. the time taken by the material to exceed the initial temperature of the plastograph (190° C).

The following results were obtained:

| Lubricating agent | Minimal resistant torque in m.kg | Decomposition time in min. | Self-heating time in min. |
| --- | --- | --- | --- |
| Glyceryl tribehenate | 1.05 | 18 | 8.5 |
| Glyceryl trimontanate | 1.13 | 14.5 | 6.5 |

From the above results, it is clear that glyceryl tribehenate is far superior to glyceryl trimontanate with regard to decomposition time and self-heating time.

4. Sticking of the lubricated resin

This study was performed by placing the resin in a mixer of which the cylinders were heated to 210° C and the material was submitted to alternate periods of 3 minutes of mixing and 3 minutes of rest, the space between the cylinders being 0.25mm.

The following results were obtained:

| Lubricating agent | Resistance time to sticking in min. |
| --- | --- |
| Glyceryl tribehenate | 11 |
| Glyceryl trimontanate | 13.5 |

Although slightly inferior in the case of glyceryl tribehenate, the resistance times to sticking of the two formulae may be considered equivalent.

(b) Comparison between calcium behenate and calcium stearate

This study was performed with the following formula:

| Ingredients | Parts by weight |
| --- | --- |
| Polyvinyl chloride | 100 |
| Anti-shock resin | 11 |
| Acrylic resin | 0.5 |
| Epoxide soja bean oil | 3 |
| Chelating agent 1832 | 0.25 |
| Solution of 2-ethyl-potassium-hexanoate containing 10% of potassium | 0.025 |
| 2-Phenyl-indole | 0.3 |
| Zinc stearate | 0.1 |
| Calcium stearate | 0.1 |
| Glyceryl trihydroxystearate | 1 |
| Calcium behenate or calcium stearate | 0.5 |

1. Static thermostability

No difference between the two resins was observed.

2. Gelation

This study was performed under the same operating conditions as in the preceding study and the following results were obtained:

| Lubricating agent | Start of gelation in sec. | End of gelation in sec. |
| --- | --- | --- |
| Calcium behenate | 15 | 90 |
| Calcium stearate | 10 | 70 |

Gelation times with calcium behenate are slightly longer than with calcium stearate.

3. Dynamic thermostability

By following the same conditions as previously described, the results given hereunder were obtained:

| Lubricating agent | Minimal resis. torque in m.kg | Decomposition time in min. | Self-heating time in min. |
|---|---|---|---|
| Calcium behenate | 1.03 | 34 | 23 |
| Calcium stearate | 1.02 | 35 | 26.5 |

Calcium behenate and calcium stearate may be considered as giving practically identical results in this test.

4. Sticking

Under the same conditions as hereabove, identical results were obtained with calcium behenate and calcium stearate, namely a resistance time to sticking of 15.5 minutes.

(c) Study of the conditions for optimal synergy of the binary mixture glyceryl tribehenate — calcium behenate This study was performed with the following formula by varying the ratio between the quantities of glyceryl tribehenate and calcium behenate:

| Ingredients | Parts by weight |
|---|---|
| Polyvinyl chloride resin | 100 |
| Anti-shock resin | 11 |
| Acrylic resin | 0.5 |
| Epoxide soja bean oil | 3 |
| Chelating agent 1832 | 0.25 |
| Solution of 2-ethyl-potassium-hexanoate containing 10% of potassium | 0.025 |
| 2-Phenyl-indole | 0.3 |
| Zinc stearate | 0.1 |
| Calcium stearate | 0.1 |
| Glyceryl trihydroxystearate | 1 |
| Glyceryl tribehenate/calcium behenate | 0.5 |

The ratio between glyceryl tribehenate and calcium behenate varied as follows:

| Formula No | 5 | 6 | 7 | 8 | 9 | 10 | 11 | 12 |
|---|---|---|---|---|---|---|---|---|
| Glyceryl tribehenate parts by weight | 0.5 | 0.4 | 0.3 | 0.25 | 0.2 | 0.1 | 0 | 0 |
| Calcium behenate parts by weight | 0 | 0.1 | 0.2 | 0.25 | 0.3 | 0.4 | 0.5 | 0 |

1. Static thermostability

No difference between the above eight formulae were observed during the first 40 minutes.

After 50 minutes, Formulae 5 and 12 were the only ones to decompose and to turn black. After 70 minutes, Formula 7 began to decompose slowly. After 80 minutes in the oven, Formulae 8, 9 and 10 were still behaving well.

2. Dynamic thermostability

The following results were obtained:

| Formula No | 5 | 6 | 7 | 8 | 9 | 10 | 11 | 12 |
|---|---|---|---|---|---|---|---|---|
| Minimal resistant torque in m.kg | 1.05 | 1.09 | 1.09 | 1.07 | 1.06 | 1.03 | 1.03 | 1.11 |
| Decomposition time in min. | 18 | 19.5 | 21 | 24.5 | 30 | 31 | 34 | 18 |
| Self-heating time in min. | 8.5 | 7 | 10.5 | 13.5 | 22.5 | 20 | 23 | 10.25 |

Decomposition time increases from 18 to 34 as the amount of calcium behenate goes from 0 to 0.5 part by weight.

3. Sticking

The following results were obtained:

| Formula No | 5 | 6 | 7 | 8 | 9 | 10 | 11 | 12 |
|---|---|---|---|---|---|---|---|---|
| Resistance time to sticking in min. | 11 | 14 | 14.5 | 16 | 17 | 16 | 15.5 | 6 |

Resistance time to sticking steadily increases from 11 to 17 minutes for formulae 5 to 9 and then decreases for the last formulae, showing a synergetic effect for a glyceryl tribehenate — calcium behenate ratio of ⅔.

4. Conclusion

From the results given hereabove it may be noted that:
- a maximal resistance time to sticking of 17 minutes was obtained with formula 9, i.e. with a glyceryl tribehenate — calcium behenate ratio of ⅔
- a decomposition time which increases with the percentage of calcium behenate. However, too great an excess of calcium behenate may affect the transparency of the thermoplastic material.

It appears from these findings that a glyceryl tribehenate — calcium behenate ratio of ⅔ is the ideal ratio for obtaining maximal resistance to sticking while maintaining good transparency.

(d) Comparison between the binary mixtures glyceryl tribehenate — calcium behenate and glyceryl trimontanate — calcium stearate The results obtained with the first mixture, which are listed in the preceding paragraph, were compared with the results observed with the mixture glyceryl trimontanate — calcium stearate, these latter results being obtained with the same formula as above but in which glyceryl tribehenate and calcium behenate were replaced respectively with glyceryl trimontanate and calcium stearate.

The ratio between the two lubricating agents varied as follows:

| Formula No | 13 | 14 | 15 | 16 | 17 | 18 | 19 |
|---|---|---|---|---|---|---|---|
| Glyceryl trimontanate parts by weight | 0.5 | 0.4 | 0.3 | 0.25 | 0.2 | 0.1 | 0 |
| Calcium stearate parts by weight | 0 | 0.1 | 0.2 | 0.25 | 0.3 | 0.4 | 0.5 |

1. Static thermostability

The results were found to be comparable to those obtained with glyceryl tribehenate — calcium behenate.

2. Dynamic thermostability and sticking

The results given hereunder were obtained:

| Formula No | 13 | 14 | 15 | 16 | 17 | 18 | 19 |
|---|---|---|---|---|---|---|---|
| Minimal resistant | | | | | | | |

-continued

| Formula No | 13 | 14 | 15 | 16 | 17 | 18 | 19 |
|---|---|---|---|---|---|---|---|
| torque in m.kg | 1.13 | 1.12 | 1.09 | 1.09 | 1.08 | 1.06 | 1.02 |
| Decomposition time in min. | 14.5 | 19 | 25 | 27.5 | 26 | 32 | 35 |
| Self-heating time in min. | 6.5 | 10.5 | 15.5 | 15.75 | 13.5 | 23 | 26.5 |
| Resistance time to sticking in min. | 13.5 | 20 | 19 | 16 | 15.5 | 15.5 | 15.5 |

These findings compared with those given in the preceding paragraph, all results being taken as a whole, are more favourable to the mixture glyceryl tribehenate — calcium behenate.

(c) Comparison between the mixtures glyceryl tribehenate — calcium behenate and 1,4-butanediol dimontanate neutralized with lime Formula 9 as set out above was compared to the same formula but containing 0.5 part by weight of 1,4-butanediol dimontanate neutralized with lime (formula No 20) instead of 0.5 part by weight of glyceryl tribehenate — calcium behenate (in the ratio of 2/3).

The following results were obtained:

| Formula No | 9 | 20 |
|---|---|---|
| Start of gelation in sec. | 100 | 100 |
| End of gelation in sec. | 290 | 285 |
| Minimal resistant torque in m.kg | 1.06 | 1.11 |
| Decomposition time in min. | 30 | 21 |
| Self-heating time in min. | 22.5 | 10 |
| Resistance time to sticking in min. | 17 | 11 |

These results show that the mixture glyceryl tribehenate — calcium behenate possesses lubricating properties which are markedly superior to those of 1,4-butanediol dimontanate neutralized with lime.

(f) Synergy of the binary mixture thiodiglycol dibehenate — calcium behenate

This study was performed with the following formula:

| Ingredients | Parts by weight |
|---|---|
| Polyvinyl chloride resin | 100 |
| Anti-shock resin | 11 |
| Acrylic resin | 0.5 |
| Epoxide soja bean oil | 3 |
| Chelating agent 1832 | 0.25 |
| Solution of 2-ethyl-potassium-hexanoate containing 10% of potassium | 0.025 |
| 2-Phenyl-indole | 0.3 |
| Zinc stearate | 0.1 |
| Calcium stearate | 0.1 |
| Glyceryl trihydroxystearate | 1 |
| External lubricating agent | 0.5 |

In this study, the external lubricating agent was either the binary mixture glyceryl tribehenate — calcium behenate, taken as reference, or thiodiglycol dibehenate alone, or the binary mixture thiodiglycol dibehenate — calcium behenate in different proportions as indicated in the following Table:

| Lubricating agent | Formula No | | | | | | | |
|---|---|---|---|---|---|---|---|---|
| | 1138 | 1139 | 1140 | 1141 | 1142 | 1143 | 1144 | 1145 |
| Glyceryl tribehenate | 0.2 | | | | | | | |
| Thiodiglycol dibehenate | | 0.5 | 0.4 | 0.3 | 0.25 | 0.2 | 0.1 | |
| Calcium behenate | 0.3 | | 0.1 | 0.2 | 0.25 | 0.3 | 0.4 | 0.5 |

1. Static thermostability

Good thermostability was obtained. However, decreasing amounts of thiodiglycol dibehenate led to slight and progressive destabilization. After 60 minutes, formula 1139 showed very good colour but was fast approaching decomposition. This latter disadvantage was eliminated by introducing 0.1 part of calcium behenate.

2. Gelation

This study was performed on a plastograph working at 150° C, turning at a speed of 30 r.p.m. and containing a charge of 25g of powder under constant pressure.

The following results were obtained:

| Formula No | Start of gelation in sec. | End of gelation in sec. |
|---|---|---|
| 1138 | 80 | 240 |
| 1139 | 110 | 240 |
| 1140 | 105 | 250 |
| 1141 | 90 | 240 |
| 1142 | 90 | 240 |
| 1143 | 90 | 240 |
| 1144 | 90 | 240 |
| 1145 | 60 | 210 |

Gelation times were very close to each other, only formula No 1145 (calcium behenate alone) having shorter gelating times.

3. Sticking

This study was performed by placing the resin in a mixer of which the cylinders were heated to 210° C and the material was submitted to alternate periods of 3 minutes of mixing and 3 minutes of rest, the space between the cylinders being 0.3mm.

The following results were obtained:

| Formula No | Sticking time in min. |
|---|---|
| 1138 | Sticking after 18 minutes |
| 1139 | Decomposition and sticking after 19.5 minutes |
| 1140 | Decomposition and sticking after 30 minutes |
| 1141 | Start of adherence at 27 minutes and sticking after 29 minutes |
| 1142 | Adherence after 25 minutes and sticking after 27 minutes |
| 1143 | Sticking after 23.5 minutes |
| 1144 | Sticking after 24 minutes |
| 1145 | Sticking after 18 minutes |

Formula No 1140, which contained 4 parts of thiodiglycol dibehenate and 1 part of calcium behenate, was the last formula to stick. However, it could not be chosen because of the degree of decomposition observed. Formula 1141 (ratio 3/2) was the most advantageous as far as lubrication without decomposition is concerned.

It should be noted that, under the operating conditions which were observed, a sticking time of 29 minutes was obtained with the mixture thiodiglycol dibehenate — calcium behenate (3/2) as opposed to only 18 minutes for the glyceryl tribehenate — calcium behenate mixture.

4. Dynamic thermostability

This study was performed on a plastograph, heated to 190° C, turning at a speed of 60 r.p.m. and containing a charge of 30g of material.

The following results were obtained:

| Formula No | Decomposition time in min. | Minimal resistant torque in m.kg | Self-heating time in min. |
|---|---|---|---|
| 1138 | 41.5 | 1.025 | 34 |
| 1139 | 26.5 | 1.050 | 27 |
| 1140 | 34 | 1.055 | 34.25 |
| 1141 | 39 | 1.025 | 34.33 |
| 1142 | 38 | 1.020 | 39 |
| 1143 | 41 | 1.015 | 34.5 |
| 1144 | 44.5 | 1.000 | 45 |
| 1145 | 42 | 1.000 | 42 |

Formula No 1141, which had been chosen after the sticking test at 210° C, showed a decomposition time of 39 minutes and a self-heating time of 34.33 minutes, which is at least as good as the performance of the reference binary mixture glyceryl tribehenate — calcium behenate (No 1138).

As far as dynamic thermostability is concerned, the most useful formula would appear to be No 1144, with a decomposition time of 44.5 minutes, but this formula presents the disadvantage of containing 0.4 part of calcium behenate, which provokes opalescence in the resin.

It may be concluded that the binary mixture thiodiglycol dibehenate — calcium behenate presents a very high degree of synergy of the lubricating properties of each of the behenates of the mixture and has lubricating properties which are comparable or superior to those of the binary mixture glyceryl tribehenate — calcium behenate, and in any case, far superior to those of the binary mixture glyceryl trimontanate — calcium stearate.

(g) Synergy of the binary mixture pentaerythrite tetrabehenate — calcium behenate This study was carried out with the same formula as that used in the previous study, except that the mixture thiodiglycol dibehenate — calcium behenate was replaced by pentaerythrite tetrabehenate — calcium behenate.

The various formulae tested are indicated in the following Table:

| External lubricating agent | Formula No | | | | | | |
|---|---|---|---|---|---|---|---|
| | 1146 | 1147 | 1148 | 1149 | 1150 | 1151 | 1145 |
| Pentaerythrite tetrabehenate | 0.5 | 0.4 | 0.3 | 0.25 | 0.2 | 0.1 | 0 |
| Calcium behenate | 0 | 0.1 | 0.2 | 0.25 | 0.3 | 0.4 | 0.5 |

1. Static thermostability

The colours which were obtained were the same as those which had been obtained with the binary mixture thiodiglycol dibehenate — calcium behenate. They become brighter when the proportion of pentaerythrite tetrabehenate was increased. However, the proportion of 0.5 part of pentaerythrite tetrabehenate is not acceptable because it leads to rapid decomposition with effect from the 60th minute (formula No 1146).

2. Gelation

By following the same procedure as in the previous study, the results given hereunder were obtained:

| Formula No | Start of gelation in sec. | End of gelation in sec. |
|---|---|---|
| 1138 | 80 | 240 |
| 1146 | 210 | 420 |
| 1147 | 180 | 340 |
| 1148 | 170 | 330 |
| 1149 | 120 | 290 |
| 1150 | 120 | 290 |
| 1151 | 90 | 250 |
| 1145 | 60 | 210 |

Gelation times gradually diminished as the proportion of calcium behenate increased. They are nevertheless superior to the times observed with glyceryl tribehenate — calcium behenate (formula No 1138).

3. Sticking

By following the same procedure as in the previous study, the results given below were obtained:

| Formula No | Sticking time in min. |
|---|---|
| 1138 | Sticking after 18 minutes |
| 1146 | Sticking after 17.5 minutes |
| 1147 | Adherence after 24 minutes and sticking after 28 minutes |
| 1148 | Sticking after 29 minutes |
| 1149 | Adherence after 21 minutes and sticking after 24 minutes |
| 1150 | Adherence after 19 minutes and sticking after 23 minutes |
| 1151 | Sticking after 19.5 minutes |
| 1145 | Sticking after 18 minutes |

The best score was obtained with formula No 1148, i.e. with pentaerythrite tetrabehenate — calcium behenate (3/2). This score is comparable to that obtained with thiodiglycol dibehenate — calcium behenate (formula No 1141) but is far superior to that of glyceryl tribehenate — calcium behenate, and consequently far superior to glyceryl trihydroxystearate — glyceryl trimontanate.

4. Dynamic thermostability

By following the same procedure as in the previous study, the results given hereunder were obtained:

| Formula No. | Decomposition time in min. | Minimal resistant torque in m.kg | Self-heating time in min. |
|---|---|---|---|
| 1138 | 41.5 | 1.025 | 34 |
| 1146 | 26 | 1.040 | 26.33 |
| 1147 | 32 | 1.030 | 32.5 |
| 1148 | 37.5 | 0.995 | 33 |
| 1149 | 41 | 1.000 | 40 |
| 1150 | 42 | 0.995 | 34.5 |
| 1151 | 43 | 0.980 | 39 |

The sticking tests had already shown the value of formula No 1148. This formula also proved to possess excellent properties with regard to thermostability.

The more the resins contain calcium behenate the better are the results with respect to decomposition time, minimal resistant torque and self-heating time, but at the same time there is a problem of opalescence.

F. External lubricating by binary mixtures of polyol behenates improved by the addition of metallic salts in tin-stabilized formulae This study was performed with the following mixtures of lubricating agents:
Mixture 1: glyceryl trihydroxystearate — glyceryl trimontanate
Mixture 2: thiodiglycol dibehenate — pentaerythrite tetrabehenate
Mixture 3: thiodiglycol dibehenate — 1,2-propanediol dibehenate
Mixture 1 constituted the reference mixture.

The three metallic salts chosen were calcium stearate, calcium montanate and calcium behenate.

The following formula of resin was used for this study:

| Ingredients | Parts by Weight |
| --- | --- |
| Polyvinyl chloride resin | 100 |
| Anti-shock resin | 10 |
| Acrylic resin | 0.5 |
| Tin stabilizer | 1.5 |
| Internal lubricating agent | 1 |
| External lubricating agent | 0.3 |
| Calcium salt | 0 or 0.3 |

Each of the mixtures 1,2 and 3 were studied with and without 0.3 part of the chosen calcium salt.

(1) Mixture 1

Four formulae were studied:
Formula No 1123: without calcium salt
Formula No 1126: calcium stearate
Formula No 1127: calcium montanate
Formula No 1128: calcium behenate (a) Static thermostability The colours observed were very close to each other. The weakest colour was obtained with formula No 1126, formula No 1128 being very near.

(b) Gelation

This study was performed on a plastograph heated to 150° C, turning at a speed of 30 r.p.m. and containing a charge of 27g of powder under constant pressure.

The following results were obtained from the gelation curves:

| Formula No | Start of gelation in sec. | End of gelation in sec. |
| --- | --- | --- |
| 1123 | 80 | 160 |
| 1126 | 60 | 160 |
| 1127 | 60 | 170 |
| 1128 | 90 | 190 |

The gelation times of calcium stearate (formula No 1126) and calcium montanate (formula No 1127) were very near to each other, while calcium behenate (formula No 1128) had a longer gelation time.

(c) Sticking

This study was performed by placing the resin in a mixer of which the cylinders were heated to 210° C and the material was submitted to alternate periods of 3 minutes of mixing and 3 minutes of rest, the space between the cylinders being 0.3mm.

The following results were obtained:

| Formula No | Sticking time in min. |
| --- | --- |
| 1123 | Sticking after 45 minutes |
| 1126 | Adherence at 24 minutes and sticking after 28 min. |
| 1127 | Sticking after 42 minutes |
| 1128 | Sticking after 31 minutes |

It may be concluded that the addition of a calcium lubricating agent does not improve the resistance to sticking and even that such resistance is considerably decreased when calcium stearate and calcium behenate are added and slightly decreased when calcium montanate is added.

(2) Mixture 2

For this study four formulae of resin were used:
Formula No. 1124: without calcium salt
Formula No. 1126A: calcium stearate
Formula No. 1127A: calcium montanate
Formula No. 1128A: calcium behenate (a) Static thermostability The three formulae containing a calcium salt gave colours which were inferior to the colour of the control resin without calcium salt (formula No. 1124).

(b) Gelation

This study was performed by following the same procedure as for the study of mixture 1.
The following results were obtained:

| Formula No | Start of gelation in sec. | End of gelation in sec. |
| --- | --- | --- |
| 1124 | 80 | 160 |
| 1126 A | 120 | 200 |
| 1127 A | 120 | 270 |
| 1128 A | 100 | 240 |

Gelation time was markedly increased for the resin containing calcium behenate (formula No. 1128 A).

(c) Sticking

This study was performed under the same conditions as hereabove.
The following results were obtained:

| Formula No | Sticking time in min. |
| --- | --- |
| 1124 | Adherence at 12 minutes and sticking after 19 minutes |
| 1126 A | Sticking after 18.5 minutes |
| 1127 A | Adherence at 24 minutes and sticking after 29 minutes |
| 1128 A | Adherence at 29 minutes and sticking after 35 minutes |

The addition of calcium stearate did not improve the resistance to sticking of mixture 2 whereas calcium montanate prolonged the resistance to sticking of mixture 2 by 10 minutes. The effect of calcium behenate was outstanding since it doubled the resistance time to sticking of mixture 2.

(3) Mixture 3

The following four formulae were studied:
Formula No 1125: without calcium salt
Formula No 1126B: calcium stearate
Formula No 1127B: calcium montanate
Formula No 1128B: calcium behenate

(a) Static thermostability

Formulae Nos 1126 B and 1128 B gave a colour which was inferior to that of the control formula No 1125, while formula No 1127 B had a colouration which was comparable to that of the latter formula.

(b) Gelation

The following results were obtained:

| Formula No | Start of gelation in sec. | End of gelation in sec. |
|---|---|---|
| 1125 | 50 | 120 |
| 1126 B | 60 | 150 |
| 1127 B | 60 | 155 |
| 1128 B | 70 | 195 |

Gelation times increased when calcium stearate was replaced by calcium montanate and the latter replaced by calcium behenate.

(c) Sticking

The following results were obtained:

| Formula No | Sticking time in min. |
|---|---|
| 1125 | Adherence at 12 minutes and sticking after 19 minutes |
| 1126 B | Adherence at 24 minutes and sticking after 28 minutes |
| 1127 B | Adherence at 30 minutes and sticking after 32.5 minutes |
| 1128 B | Adherence at 30 minutes and sticking after 35 minutes |

Calcium stearate prolonged sticking time by 9 minutes and calcium montanate by 13.5 minutes. Calcium behenate had the best score since it prolonged sticking time by 16 minutes.

(4) General conclusion

As far as external lubrication of tin-stabilized resins is concerned, the mixtures of polyol behenates and, more especially, thiodiglycol dibehenate - pentaerythrite tetrabehenate and thiodiglycol dibehenate - 1,2-propanediol dibehenate, were found to be compatible with calcium salts, particularly calcium behenate.

In this kind of resin, polyol behenates are markedly superior to known lubricating agents such as glyceryl trihydroxystearate and glyceryltrimontanate. It may be noted that the addition of calcium behenate to mixtures of polyol behenates enables the sticking time of the resin to be doubled.

G. Lubricating power of the behenates of the invention with respect to co-polymers of polyvinyl chloride The lubricating action of glyceryl tribehenate - 1,2-propanediol dibehenate on a polyvinyl chloride - polyvinilidene chloride co-polymer was studied using the following formula of resin:

| Ingredients | Parts by weight |
|---|---|
| Polyvinyl chloride resin | 90 |
| Polyvinyl chloride - polyvinilidene chloride co-polymer | 10 |
| Modifying agent | 7 |
| Acrylic resin | 2 |
| Tin stabilizer | 1.6 |
| 2-Phenyl indole | 0.3 |
| Antioxydant | 0.1 |
| Internal lubricating agent | 0.5 |
| Wax | 0.25 |
| Silica | 0.2 |
| Glyceryl tribehenate | 0.5 |
| 1,2-Propanediol dibehenate | 0.5 |

1. Static thermostability

An excellent colour was obtained up to 50 minutes.

2. Gelation

This study was performed on a plastograph heated to 150° C, turning at a speed of 30 r.p.m. and containing a charge of 27g of power under constant pressure.
The following results were obtained:
Start of gelation in sec. 30
End of gelation in sec. 210

3. Dynamic thermostability

This study was performed on a plastograph heated to 190° C, turning at a speed of 60 r.p.m. and containing a charge of 30g of material.
The following results were obtained:
Decomposition time: 28.5 min.
Minimal resistant torque: 1.205 m.kg
Self-heating time: 2.5 min. at 190° C
27.33 min. at 195° C.

The results obtained were very good, account being taken of the proportion of co-polymer (10 parts) in the resin.

4. Sticking

No sticking was observed after 45 minutes.

H. Extractibility of the lubricating agents

The lubricating agents according to the invention may be used to lubricate polymers which are intended for the manufacture of packaging and containers for food and drink and its was therefore necessary, in spite of their low toxicity, to determine their extractibility by various solvents simulating food and drink, namely water, ethanol-water 50/50, an aqueous solution of acetic acid (3%) and heptane.

This study was carried out in accordance with the requirements of the Food and Drug Administration (U.S.A.).

The following formulae were used for this study:

| Ingredients | Formula No 913 | 914 | 915 | 916 |
|---|---|---|---|---|
| Polyvinyl chloride resin | 100 | 100 | 100 | 100 |
| Strengthening agent | 11 | 11 | 11 | 11 |
| Acrylic resin | 0.5 | 0.5 | 0.5 | 0.5 |
| Epoxide soja bean oil | 3 | 3 | 3 | 3 |
| Chelating agent 1832 | 0.25 | 0.25 | 0.25 | 0.25 |
| 2-Phenyl-indole | 0.3 | 0.3 | 0.3 | 0.3 |
| Zinc stearate | 0.1 | 0.1 | 0.1 | 0.1 |
| Calcium stearate | 0.3 | 0.3 | 0.3 | 0.3 |
| Thiodiglycol dibehenate | 1 | 1 | 1 | — |
| Pentaerythrite tetrabehenate | 0.3 | — | — | — |
| 1,4-Butanediol dibehenate | — | 0.3 | — | — |
| 1,2-Propanediol dibehenate | — | — | 0.3 | — |

The extractions were performed in semi-rigid bottles, prepared with the resins given hereabove.
The bottles had the following specifications:

Diameter: 62 mm
Height: 170 mm
Capacity: 375 ml
Weight: 28 g

The ratio of the volume of solvent to the surface of plastic material exposed to extraction was about 1 to 100ml of solvent, taking into account the geometric characteristics of the bottles.

Operating conditions

Temperature—: 49° C
Heating—: A thermostated oven for the non-inflammable solvents (water and acetic acid) A thermostated water-bath for the inflammable solvents (alcohol and heptane)

Duration of extraction

This was, in each case, intentionally longer than that which would have given stable maximum values.

The following periods of duration were in fact, observed:
Water: 15 days
Acetic acid (3%) : 15 days
Aqueous ethanol: 3 to 4 days
Heptane: 3 days The quantity of lubricating agent extracted was determined by thin layer chromatography, by comparison with a standard scale.

A blank trial was carried out with control bottles containing no lubricating agent and a purely negative result was obtained.

The results which were obtained are listed in the table given hereunder. The amounts of lubricating agent determined are expressed in μg/ml of extraction solvent or, which is the same, per cm² of surface submitted to extraction.

| Formula No | Lubricating agent | Solvents | | | |
|---|---|---|---|---|---|
| | | Heptane | Aqueous ethanol | Water | Acetic acid |
| 913 | Thiodiglycol dibehenate | 1.3 | 0.6 | 0.13 | 0.4 |
| | Pentaerythrite tetrabehenate | 0.26 | 0.13 | 0.13 | 0.26 |
| 914 | Thiodiglycol dibehenate | 0.8 | 0.13 | 0.13 | 0.13 |
| | 1,4-Butanediol dibehenate | 0.8 | 0.13 | 0.13 | 0.13 |
| 915 | Thiodiglycol dibehenate | 0.6 | 0.13 | 0.13 | 0.13 |
| | 1,2-Propanediol dibehenate | 0.26 | 0.13 | 0.13 | 0.13 |
| 916 | Thiodiglycol dibehenate | 0 | 0 | 0 | 0 |
| | Pentaerythrite tetrabehenate | 0 | 0 | 0 | 0 |
| | 1,4-Butanediol dibehenate | 0 | 0 | 0 | 0 |
| | 1,2-Propanediol dibehenate | 0 | 0 | 0 | 0 |

These results show that the four lubricating agents tested have strong resistance to solvents simulating food and drink, particularly water, which is important because it is closely related to the problem of providing containers for mineral waters and the possible pollution of the latter by the recipient in polyvinyl chloride.

The results obtained with water are below or near to the sensitivity threshold of the method of assay.

(I) Study of the tendency for bubbles to appear in the polyvinyl chlorides containing the lubricating agents of the invention It is known that a release of gas during preparation of the resin and particularly at the moment of extrusion or blowing is a grave disadvantage when manufacturing objects such as bottles because it may lead to the formation of visible bubbles in the plastic.

The following findings were noted:

| Lubricating agent | Temperature at which bubbles appear | Observations |
|---|---|---|
| Glyceryl trimontanate | 150° C | Release increasing with temperature |
| Glyceryl tribehenate | 230° C | Slight release |
| 1,2-Propanediol dibehenate | 250° C | No release |
| Pentaerythrite tetrabehenate | 195° C | Slight release |

By combining different behenates, it is possible to obtain lubricating associations which are as good as or even better than the known associations of montanates.

A further advantage of the behenates is particularly important with regard to the various uses of the resins.

The behenates generally do not produce any release of gas when the temperature of the resin increases progressively to 250° C.

The lubricating agents covered by the invention, whether alone or in combination, generally are incorporated into the thermoplastic material in proportions ranging from 0.5 to 2 parts by weight.

The following Examples provide a non-limitative illustration of the processes of preparation of the substances covered by the invention:

EXAMPLE 1

1,2-Propanediol dibehenate

Into a 500 ml-flask equipped with a central stirrer, a dropping-funnel, a source of nitrogen, a thermometer, a Dean-Stark separator and a vertical condenser, were introduced 256.5g (0.75 mol) of behenic acid which was progressively heated, while stirring, until completely melted (about 70° C), after which 30.4g (0.4 mol) of 1,2-propanediol and 0.50g of a 50% aqueous solution of sodium hydroxide were added.

The reaction medium was heated, under nitrogen atmosphere, to 195° – 200° C over a period of 3 hours, then to 220° – 225° C over a period of 2 hours and this latter temperature was maintained for about 4 hours, until an acid number inferior or equal to 12 was obtained.

The reaction medium was cooled to about 150° C and the molten material was poured onto a stainless steel plate. After cooling, 272g of 1,2-propanediol dibehenate were obtained.

M.P.: 52° C – Yield: 100%

By following the same procedure but using the appropriate starting-products the following compounds were prepared:

| Compound | Melting Point |
|---|---|
| 1,4-Butanediol dibehenate | 68° C |
| Pentaerythrite tetrabehenate | 70° C |

EXAMPLE 2

Thiodiglycol dibehenate

Into a 1250ml-flask equipped with a central stirrer, a dropping-funnel, a source of nitrogen, a thermometer, a Dean-Stark separator and a vertical condenser, were introduced 224.5g (0.66 mol) of behenic acid and the medium was progressively heated until the behenic acid was completely melted (about 70° C), after which 44.25g (0.28 mol) of thiodiglycol and 0.50g of a 50% aqueous solution of sodium hydroxide were added while stirring.

The reaction medium was heated, under nitrogen atmosphere, to 195° C over a period of 3 hours, then to 225° C over a period of 2 hours and this latter temperature was maintained for about 4 hours, until an acid number inferior or equal to 12 was obtained.

The mixture was cooled to 90° – 95° C and the molten material was poured onto a stainless steel plate. After cooling, 246g of thiodiglycol dibehenate were obtained.
M.P.: 73° C — Yield: 97%

EXAMPLE 3

Diethyleneglycol dibehenate

Into a two liter-flask equipped with a central stirrer, a thermometer, a Vigreux column and a vertical condenser fitted to a receptacle, were introduced 1280g (3.8 mols) of behenic acid and 226g (2.13 mols) of diethyleneglycol. The reaction medium, under nitrogen atmosphere, was slowly heated until the mixture was completely melted (about 75° C) and 1.3g of sodium hydroxide pastilles, dissolved in a minimum of water, were added. The reaction medium was gradually heated to reflux in the Vigreux column and then to a temperature which provoked distillation of the water in the medium (about 145° – 150° C), without causing distillation of the diethyleneglycol. As soon as the temperature reached 220° C, the Vigreux column was removed and the temperature maintained for about four hours, until an acid number of about 10 was obtained. The reaction medium was cooled to about 70° C and the molten material was poured onto a stainless steel plate. After cooling, 1406g of diethyleneglycol dibehenate was obtained.
M.P.: 59° C — Yield: 99%

By following the same procedure but using the appropriate starting-products, the following compounds were prepared:

| Compound | Melting Point |
|---|---|
| Dipentaerythrite pentabehenate | 63° C |
| Triethyleneglycol | 54° C |

EXAMPLE 4

Trimethylolpropane tribehenate

Into a two liter-flask equipped with a central stirrer, a thermometer and a vertical condenser fitted to a receptacle, were introduced 1440g (4.25 mols) of behenic acid and 219.5g (1.6 mol) of trimethylolpropane. The reaction medium was slowly heated, under nitrogen atmosphere, until the medium was completely melted and 1.4g of sodium hydroxide pastilles, dissolved in a minimum of water, were added. The reaction medium was gradually heated to a temperature which provoked distillation of the water in the medium, without causing distillation of the trimethylolpropane. The medium was then heated to 220° C and this temperature was maintained for about 4 hours until the acid number was about 4. After cooling to 90° C, the medium was decoloured by means of hydrogen peroxide (200 volumes). The temperature was maintained at 90° to 95° C for 30 minutes and the molten material was poured onto a stainless steel plate. After cooling, 1550g of trimethylolpropane tribehenate were obtained.
M.P.: 52° C — Yield: 99.3%

EXAMPLE 5

Glyceryl tribehenate

Into a 500ml-flask equipped with a central stirrer, a dropping funnel, a source of nitrogen, a thermometer, a Dean-Stark separator and a vertical condenser, were introduced 344g (1 mol) of behenic acid. The medium was gradually heated, while stirring, until the acid was completely melted (about 70° C) and 35.3g (0.4 mol) of glycerol and 0.68g of a 50% aqueous solution of sodium hydroxide were added.

The reaction medium was heated, under nitrogen atmosphere, to 190° – 200° C over a period of 3 hours and then to 220° – 225° C over a period of 2 hours.

This latter temperature was maintained for about 4 hours, until an acid number inferior or equal to 15 was obtained.

The reaction medium was cooled to about 140° C and the molten material was poured onto a stainless steel plate.

After cooling, 357g of glyceryl tribehenate were obtained. M.P.: 64° C — Yield: 100%

We claim:

1. New lubricating compositions for thermoplastic materials comprising thiodiglycol dibehenate and an ester lubricating agent selected from the group consisting of 1,4-butanediol dibehenate, pentaerythritol tetrabehenate, and 1,2-propanediol dibehenate and mixture thereof, the compositions being formulated so that thiodiglycol dibehenate is present in the proportion of eight to ten parts by weight to three parts by weight of the other ester or esters.

2. New lubricating compositions according to claim 1 wherein thiodiglycol dibehenate and pentaerythritol tetrabehenate are in the weight ratio of 10 to 3.

3. New lubricating compositions according to claim 1 wherein thiodiglycol dibehenate and pentaerythritol tetrabehenate are in the weight ratio of 8 to 3.

4. New lubricating compositions according to claim 1 wherein thiodiglycol dibehenate and 1,4-butanediol dibehenate are in the weight ratio of 10 to 3.

5. New lubricating compositions according to claim 1 wherein thiodiglycol dibehenate and 1,2-propanediol dibehenate are in the ratio of 10 to 3.

6. New lubricating compositions according to claim 1 comprising one part by weight of thiodiglycol dibehenate, 0.3 part by weight of pentaerythritol tetrabehenate and 0.3 part by weight of calcium behenate.

7. New lubricating compositions according to claim 1 comprising one part by wight of thiodiglycol dibehenate, 0.3 part by weight of 1,2-propanediol dibehenate and 0.3 part by weight of calcium behenate.

* * * * *